United States Patent [19]
Henderson et al.

[11] Patent Number: 5,141,005
[45] Date of Patent: Aug. 25, 1992

[54] TOBACCO SAMPLE TRANSFER APPARATUS AND METHOD

[75] Inventors: Richard M. Henderson; Roger A. Foote, both of Winston-Salem, N.C.; Aubrey L. Swofford, Greenwood, S.C.; Henry H. Warren, Jr., Clemmons, N.C.; D. Randall McHone, Winston-Salem, N.C.; John D. Parkman, Ware Schoals, S.C.; Harvey E. Williams, Jr., Iva, S.C.

[73] Assignee: R. J. Reynolds Tobacco Company, Winston-Salem, N.C.

[21] Appl. No.: 436,843

[22] Filed: Nov. 13, 1989

[51] Int. Cl.⁵ .............................................. A24C 5/00
[52] U.S. Cl. .................................... 131/306; 131/108
[58] Field of Search .............................. 131/108, 306

[56] References Cited
U.S. PATENT DOCUMENTS 4,719,928  1/1988  Mitchell, Jr. et al.

Primary Examiner—V. Millin
Attorney, Agent, or Firm—Grover M. Myers

[57] ABSTRACT

A method of and an apparatus for automatically taking a cored sample of tobacco from a bale of tobacco and pneumatically transferring the sample to a remotely located receiving station, such as a stem content analyzer, are disclosed. A sample canister with vacuum-operated end closures for use in the pneumatic transfer of the tobacco sample is also disclosed. A compacted, cored sample of tobacco is delaminated and then deposited into an open sample canister which is closed and pneumatically transported to a stem content analyzer where it is opened, upended to deposit the sample into the stem content analyzer, reclosed and pneumatically returned for another sample of tobacco.

39 Claims, 10 Drawing Sheets

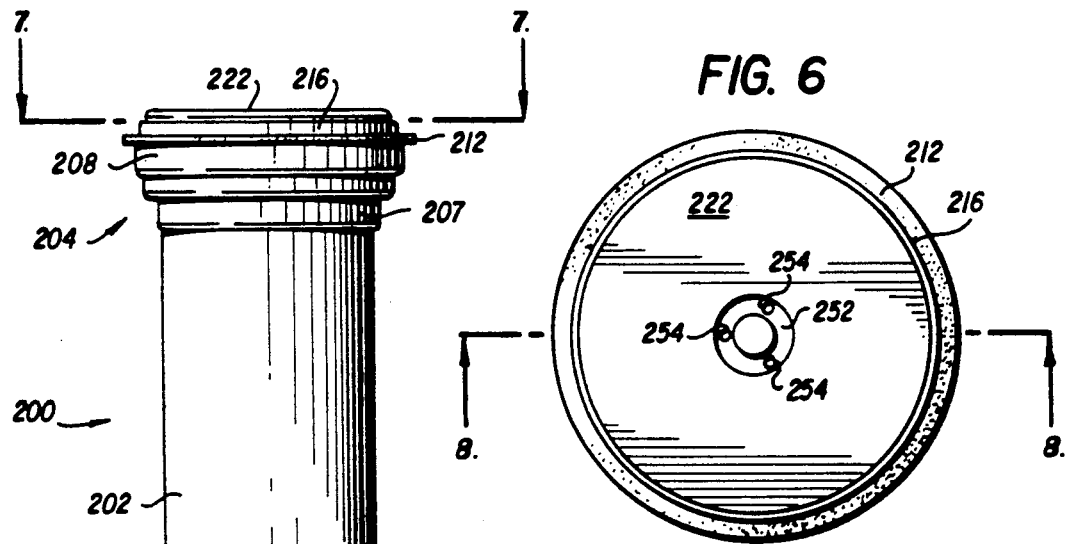

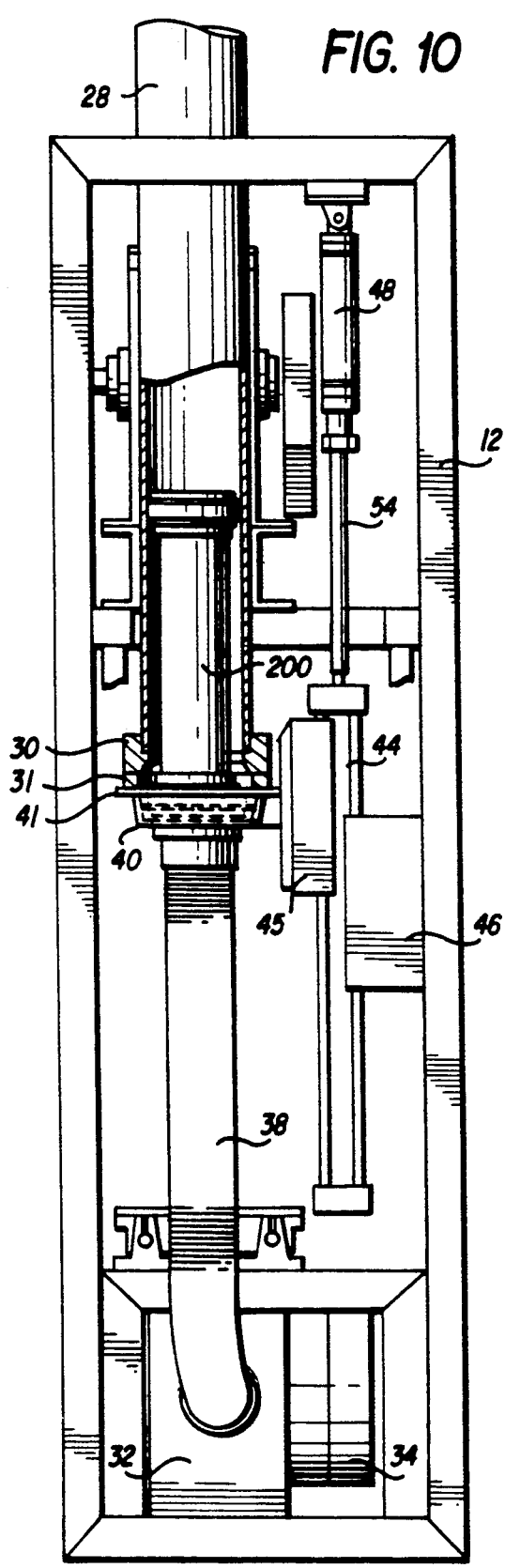
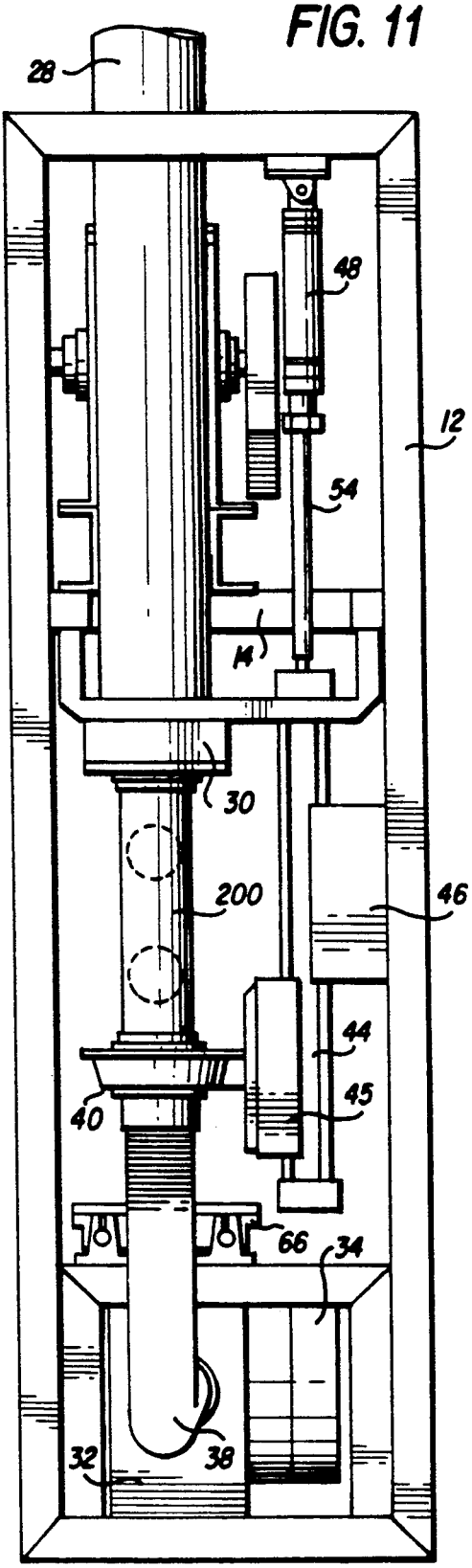

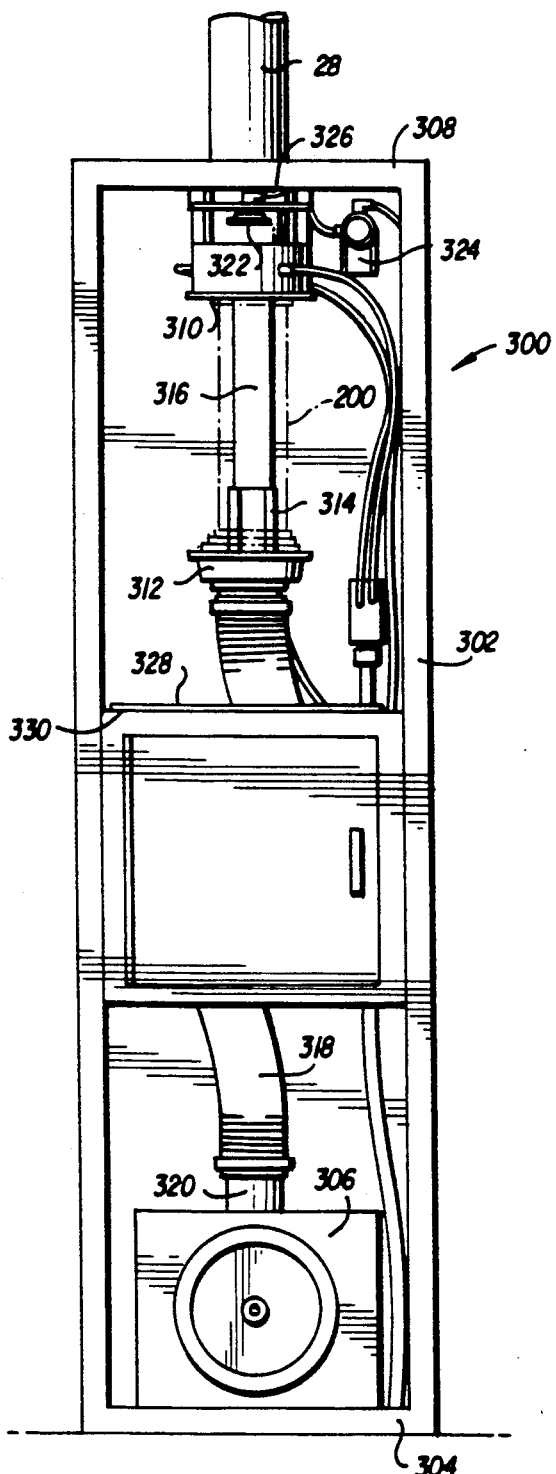
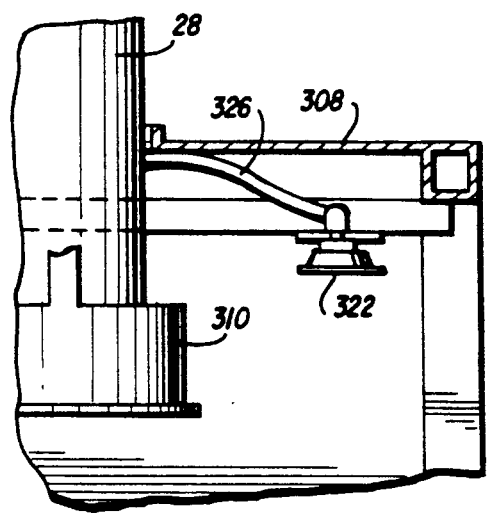
FIG. 17
FIG. 18

TOBACCO SAMPLE TRANSFER APPARATUS AND METHOD

FIELD OF THE INVENTION

The present invention relates to a method of and an apparatus for automatically sampling a material and transporting the sample from one location to another, remote location. More particularly, the invention relates to a method of and apparatus for automatically removing a sample of tobacco from a bale or hogshead of processed tobacco and pneumatically conveying the tobacco sample to an automatic stem content analyzer, or to a manual receiving station at a remote location.

DESCRIPTION OF THE PRIOR ART

In the processing of tobacco for manufacture of smoking articles, such as cigarettes, the stem content of the tobacco used in the manufacturing process is carefully monitored and controlled to assure the quality and uniformity of the final product. Stem content and other tobacco physical and chemical properties are often measured to evaluate the quality and uniformity of processed tobacco. For example, automatic stem content analyzers have been developed for determining the stem content of the processed tobacco. Based on the determined value of stem content of the tobacco in such an analyzer, a feedback-type system may be utilized, for example, in a stemming operation, to regulate the stem content of the strip tobacco undergoing processing. In U.S. patent application Ser. No. 324,887, filed Mar. 17, 1989 and assigned to the assignee of the present invention, there is disclosed a stem content analyzer of the aforementioned type. The disclosure of that application is incorporated herein by reference.

As described in U.S. application Ser. No. 324,887, the prior techniques for determining stem content of tobacco involved a number of manual steps and resulted in the lapse of a considerable time interval between the taking of the sample and the realization of the results of the stem content determination. That time delay resulted in a delay in making adjustments to the stemming operation necessary to maintain the high quality and uniformity of the cigarettes produced from the processed strip tobacco.

Even with the development of automated apparatus for making the stem content determination, as described in the aforesaid U.S. application Ser. No. 324,887, it is still necessary to minimize the time delay between the taking of the sample from the bale of tobacco and the introduction of the sample into the stem content analyzer. In the usual case, the stem content analyzer is located remotely from the sample-taking apparatus, which is positioned adjacent the conveyor carrying the baled tobacco. Accordingly, delays inherently result in inputting the sample to the stem content analyzer, particularly where the sample input is manually performed.

U.S. Pat. No. 4,719,928 to Mitchell, Jr. et al, assigned to the same assignee as the present invention, also discloses an apparatus for determining stem content of tobacco strip samples which is designed to reduce the time between sample taking and adjustment of the stemming operation. That patent discloses a conventional sample taking apparatus with a sample coring tube from which a tobacco sample is discharged into a milling or threshing device where the compressed sample from the tobacco bale is "delaminated." As used herein, the term "delaminate" means to separate the layers of strip tobacco in the compressed cored sample. The delaminated sample is then pneumatically transferred in loose form to the stem content analyzer via a conduit connected to a vacuum pump.

Because of the relatively short distance between the sample taking apparatus and the stem content analyzer, pneumatic transfer of the tobacco sample over that distance does not create any significant problems. However, where the pneumatic transfer conduit is of a substantial length, such as where the stem content analyzer is located remotely from the sample taking apparatus, pneumatic transfer of the tobacco sample in its particulate form is inefficient and can result in plugging or blockage of the pneumatic transfer conduit. In addition, transfer of the tobacco sample in loose form can cause inaccurate results because of variations in the properties of the tobacco, such as moisture content and stem content.

Other prior art physical and chemical measurements of tobacco, apart from stem content analysis, are typically performed by manually transporting a cored sample of tobacco to a test station for making the measurement.

SUMMARY OF THE INVENTION

It is a principal object of the present invention to provide a new and improved method of and apparatus for automatically transferring a sample of tobacco cored from a bale of processed strip or leaf tobacco to a remotely located stem content analyzer, and thereby to reduce the time delay between the taking of the sample, the determination of the stem content of the sample, and ultimately the making of adjustments to the stemming operation.

The present invention provides certain improvements in the known methods and apparatus described in the Mitchell, Jr. et al patent for transferring a sample of tobacco in particulate form to a stem content analyzer for a determination of stem content. According to one important feature of the present invention, after the compressed, cored sample is broken up in a milling device, it is deposited into an open transfer canister, the ends of which are provided with vacuum-operated end closures. The closed canister containing a delaminated tobacco sample is transferred to and inserted in a pneumatic tube and pneumatically transported via the tube to a remotely located stem content analyzer. At the stem content analyzer, one of the canister closures is removed, the contents of the canister are automatically deposited into the input receptacle of the stem content analyzer, the canister is reclosed, returned empty to the sample-taking apparatus and reopened to receive a new tobacco sample from a subsequent bale of tobacco.

Another significant feature of the present invention is the construction and operation of the sample canister which is designed to be pneumatically transported between the sample-taking apparatus and the stem content analyzer. The cylindrical canister is provided at its opposite ends with vacuum-operated closures. One of the closures is automatically removed and retained by a suction cup at the sample-taking apparatus prior to receiving the sample, then, after the sample is deposited in the canister, the canister is reclosed with the closure. At the stem content analyzer, the closure at the opposite end of the canister is similarly removed from the canister and retained by a suction cup while the tobacco sample is deposited into the input receptacle of the analyzer, after which the closure is replaced on the canister for the return transfer of the canister to the sample-taking apparatus.

From the foregoing summary, it will be observed that another object of the present invention is to fully automate the sample-taking and stem content determination apparatus so that human intervention and the inherent delays resulting therefrom are eliminated.

A related object of the invention is to provide an improved method of and apparatus for pneumatically transporting a relatively large sample of material to a remote location while maintaining the original integrity of the sample.

It is a further object of the present invention to provide a pneumatically conveyed canister with an improved construction, including improved vacuum-operated closures at the opposite ends thereof.

BRIEF DESCRIPTION OF THE DRAWINGS

The above and still further objects, features and attendant advantages of the present invention will become apparent to those skilled in the art from a consideration of the following detailed description of a presently preferred embodiment thereof, taken in conjunction with the accompanying drawings in which:

FIG. 5 is a side elevation view of the sample canister of the present invention for pneumatically transporting the tobacco sample from the sample-taking and transfer apparatus to the stem content analyzer;

FIG. 6 is a top view of the canister of FIG. 5 showing one of the vacuum-operated end closures;

FIG. 7 is an end view of the canister along line 7—7 of FIG. 5 with the end closure removed;

FIG. 8 is an enlarged cross-sectional view of the end closure of the canister taken along line 8—8 of FIG. 6;

FIG. 10 is an end elevation view of the transfer apparatus of FIG. 1 illustrating the position of the transfer mechanisms when the sample canister containing a sample is to be transported to the stem content analyzer or when the empty sample canister has been returned from the stem content analyzer;

FIG. 11 is an end elevation view of the transfer apparatus of FIG. 1 illustrating the positions of the transfer mechanisms and sample canister during the transfer sequence;

FIG. 17 is an elevation view of another type of sample receiving station that may be used instead of the stem content analyzer receiving station shown in FIGS. 4A–4C; and FIG. 18 is an enlarged detail view partly in cross-section showing the closure removal arrangement of the receiving station of FIG. 17.

DETAILED DESCRIPTION OF THE PREFERRED EMBODIMENT

Figure 1:
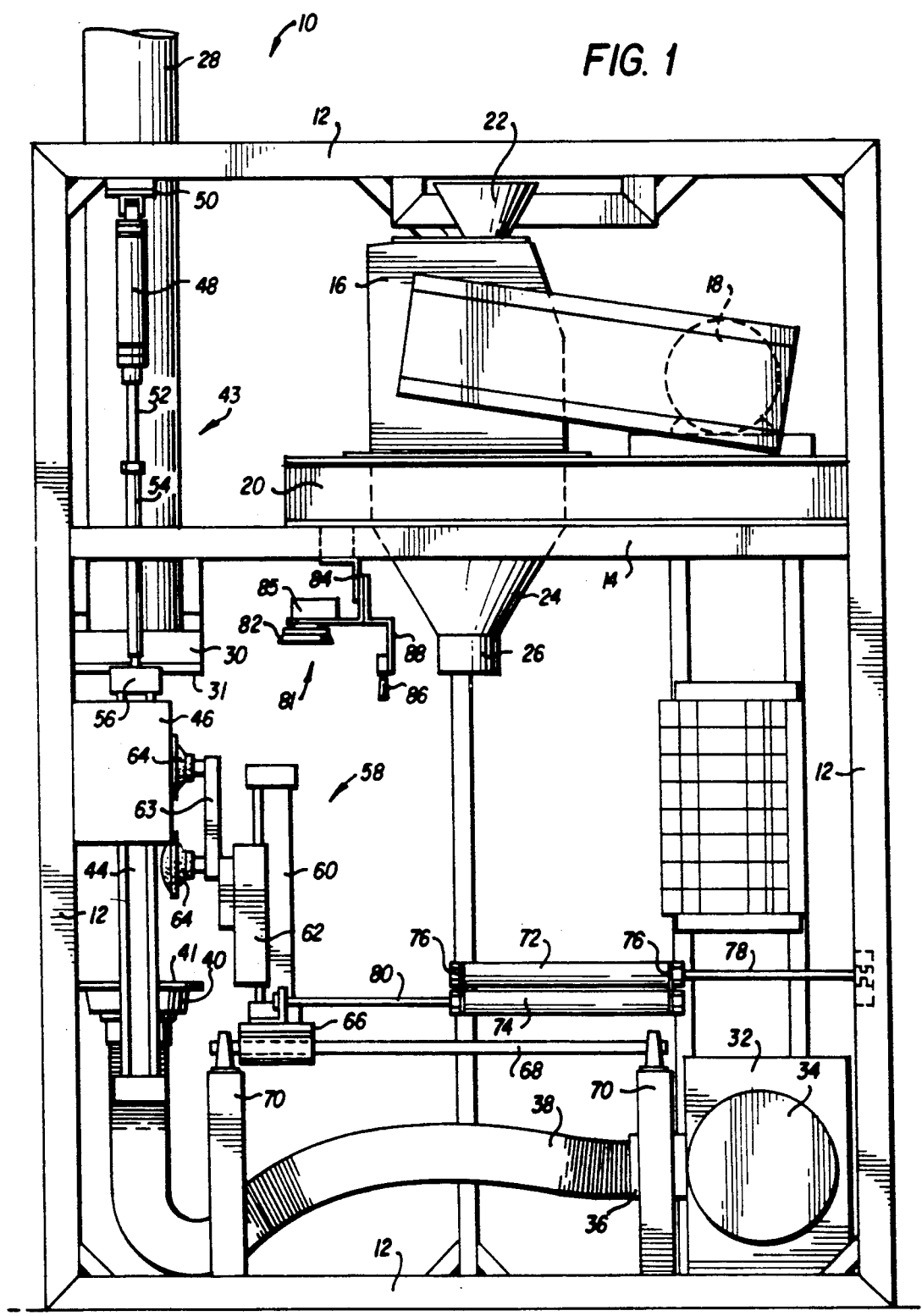
FIG. 1 is a side elevation view of a portion of the sample transfer apparatus according to the present invention.

Referring now to the drawings, FIG. 1 illustrates that portion of the transfer apparatus 10 at which a tobacco sample is deposited in a canister for transport to the stem content analyzer. The transfer apparatus 10 comprises a welded metal frame 12 which may be enclosed in a sheet metal or, preferably, a plastic enclosure (not shown), the latter of which has one or more transparent sides or doors to permit access and viewing of the operation of the transfer apparatus. Frame 12 includes cross members 14 on which a hammermill 16 and its drive motor 18 are supported on a base 20. A conventional hammermill that is suitable for use in the present invention is a Buffalo Hammermill No. W-6-L with a 1" round hole screen, and which is driven by a 1 HP 230/460 VAC 3 phase, 60 Hz drive motor.

Disposed at the upper end of the hammermill 16 is a short inlet funnel 22 into which a compressed cored tobacco sample is introduced in a manner and by apparatus to be described hereinafter. The lower or outlet end of the hammermill 16 is provided with a funnel-like discharge member 24 having a cylindrical outlet tube 26.

As described in the aforesaid U.S. application Ser. No. 324,887, the process by which the tobacco sample is cored from the already compressed bale of tobacco tends to further compress the sample so that the sample has the appearance of a large elongated cylindrical cake or plug of tobacco. For that reason, it is necessary to deliver the sample to a milling device, such as hammermill 16, for dividing the sample into smaller pieces by delaminating the sample.

A pneumatic transfer tube 28 of approximately 6 inches in diameter extends into the frame 12 from above and terminates in a downwardly open end fitting 30 suspended from cross member 14. A high volume air blower 32 having a filtered air inlet 34 is mounted in the lower portion of the frame 12 and is provided with an air outlet 36 to which is attached a flexible conduit 38. The flexible conduit 38 has an end fitting 40 at the free end thereof which is guided for vertical movement so as to sealingly engage the open end fitting 30 of the pneumatic tube 28. One or both of the mating surfaces 31, 41 of the end fittings 30, 40, respectively, may be provided with a gasket-like seal to prevent leakage of air from between the surfaces 31, 41 when air blower 32 is operating to force air upwardly through pneumatic transfer tube 28.

It will be appreciated by those skilled in the art that the volumetric capacity of the air blower 32 will depend on a number of design characteristics of the system, including, among others, the length and diameter of the pneumatic tubing, the weight of the object, in this case the sample canister (FIGS. 5-9), to be transported through the tube, the frictional forces between the canister and the tube, the number and radius of bends or direction changes in the length of the pneumatic tubing, the desired velocity of the canister, the characteristics of the relief valves in the pneumatic tubing, etc. A blower that has been found suitable for use in one application of the present invention is a Model 115923 manufactured by AMETEK Lamb Electric Division of Kent, Ohio.

Figure 12:
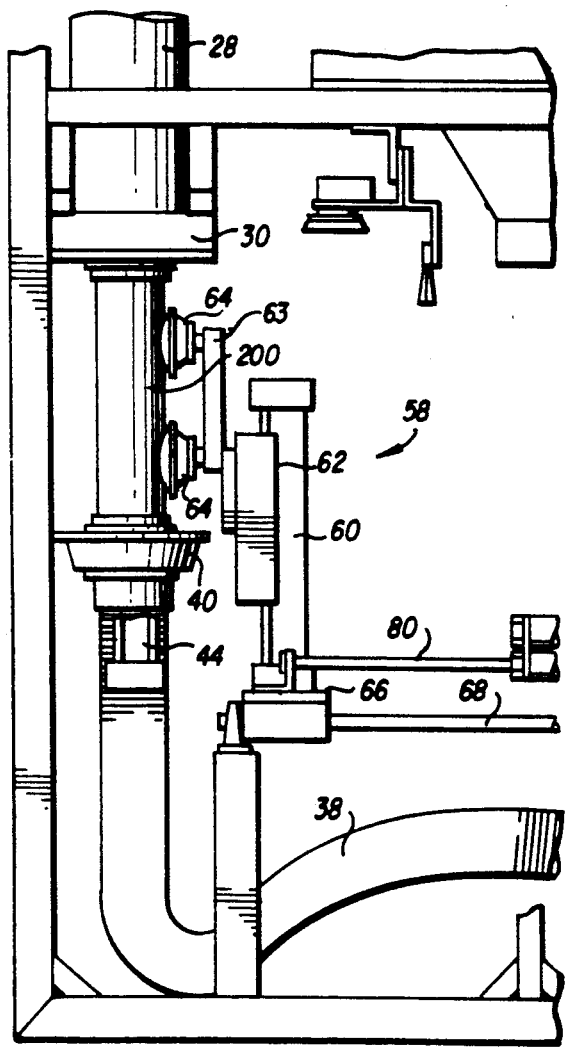
FIG. 12 is a side elevation view of the transfer apparatus of FIG. in which the positions of the transfer mechanisms and sample canister correspond to those of FIG. 11 and showing the engagement of the canister by suction cups.

The end fitting 40 is mounted to means 43 for vertically moving the fitting to given vertical positions in the transfer sequence. Means 43 includes a rodless cylinder 44 having a movable slide 45 (FIGS. 10-12). Rodless cylinder 44 is preferably a pneumatically operated rodless cylinder manufactured by Norgren of Littleton, Colo. and designated LINTRA Model 45040. Other types of linear actuators, including mechanical, hydraulic, pneumatic or electrical may also be used. Rodless cylinder 44 is itself slidably mounted for limited vertical movement in a guide block 46 rigidly secured to frame 12. Means 43 also includes a double-acting fluid-operated cylinder 48 suspended by a fitting 50 welded or bolted to the frame 12 in axial alignment with the rodless cylinder 44. The piston rod 52 of cylinder 48 is connected by an extension rod 54 to the upper end 56 of rodless cylinder 44 so as to move the rodless cylinder 44 up or down along its longitudinal axis when the piston rod 52 is retracted or extended, respectively. The combination of movements of the cylinder 48 and rodless cylinder 44 determine the vertical position of the end fitting 40 in the sequence of movements thereof. A sample canister (FIGS. 5-9) would ordinarily be supported on the lower end fitting 40 when the fitting is vertically moved during the transfer sequence as will be described in detail hereinafter.

The means for moving the sample canister into position for receiving a tobacco sample is designated generally by reference numeral 58. That means includes a rodless cylinder 60 which may be a rodless cylinder of the same type as rodless cylinder 44 except shorter in length. Rodless cylinder 60 has a slide member 62 with an arm 63 to which is secured a pair of vertically aligned suction cups 64 connected to a vacuum source (not shown). The suction cups 64 support a sample canister during its transfer to the sample receiving position beneath outlet tube 26 in a manner to be described. Rodless cylinder 60 is rigidly supported on a carriage 66 which is slidably mounted for horizontal movement on a spaced pair of guide rods 68 (only one shown in FIG. 1). Guide rods 68 are supported at the upper ends of four posts 70 secured to the base or floor of the frame 12.

A pair of double-acting fluid cylinders 72, 74, such as pneumatic cylinders, are rigidly mounted to one another by a pair of brackets 76. The piston rods or actuating rods 78, 80 of the cylinders 72, 74 are oppositely directed, rod 80 being connected to the rodless cylinder carriage 66 and rod 78 being connected to the frame 12 so that the carriage 66 can be horizontally moved along the guide rods 68 discrete distances corresponding to the stroke of one or the other cylinder or the strokes of both cylinders combined.

Means 81 for removing and replacing the end closure of a sample canister comprises a suction cup 82 secured to a cross member 14 of the frame by a bracket 84. Suction cup 82 is connected to a vacuum source 85. A brush 86 may optionally be mounted to the bracket 84 by another bracket 88.

Figure 3:
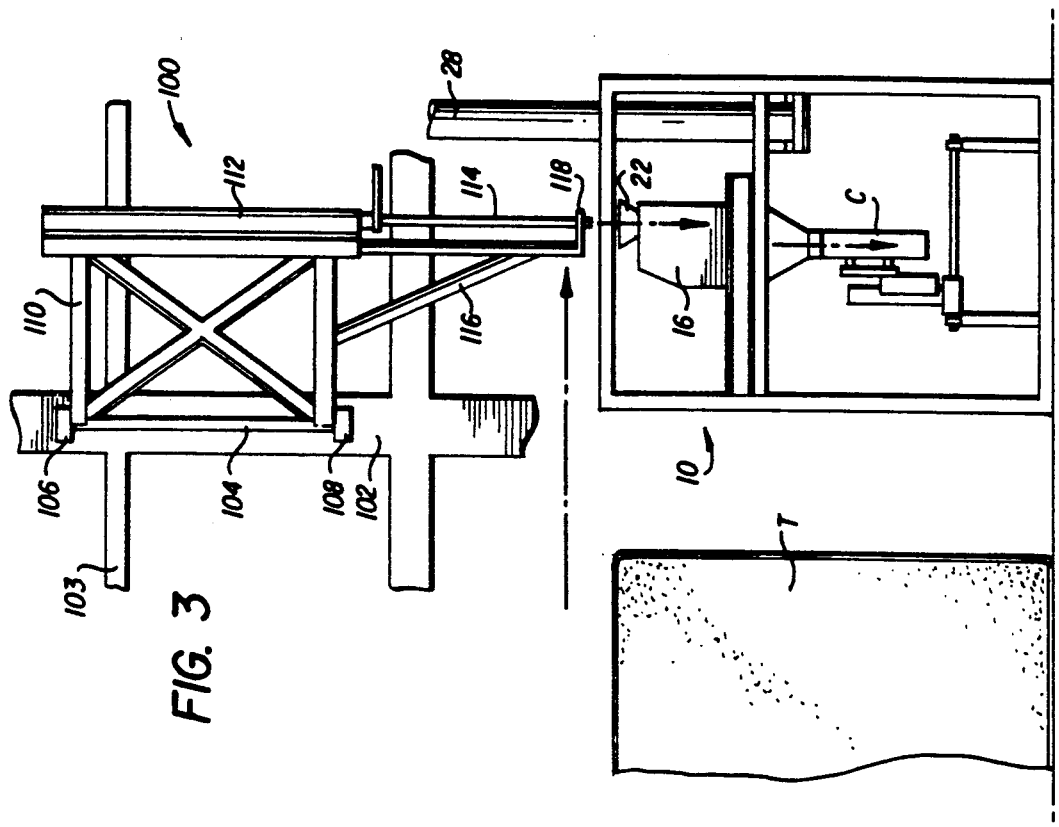
FIGS. 2 and 3 are elevation views illustrating a conventional apparatus for obtaining a cored sample from a bale of tobacco and the manner in which it is utilized with the transfer apparatus shown in FIG. 1.
Figure 2:
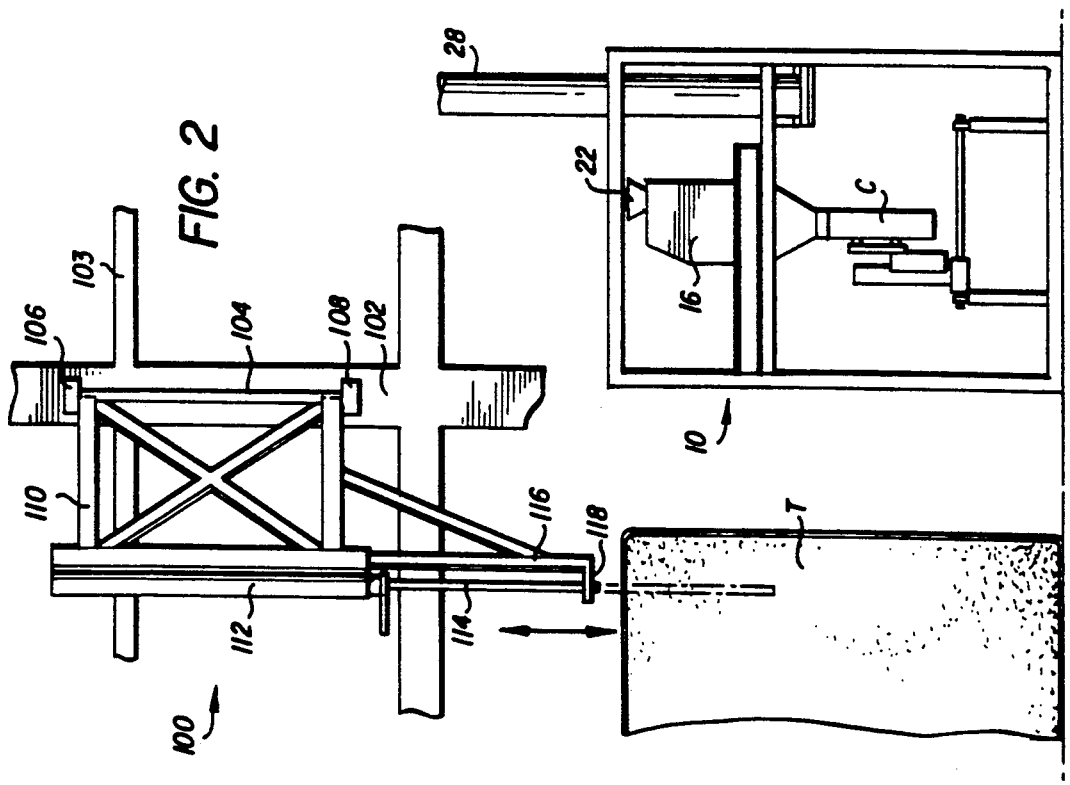

FIGS. 2 and 3 illustrate a conventional sample-taking apparatus which is designated generally by reference numeral 100. Apparatus 100 is pivotally mounted to a vertical post 102 by means of a pivot shaft 104 supported in bearings 106, 108 secured to post 102. The apparatus 100 is disposed between the transfer apparatus 10 of the present invention and a roller conveyor (not shown) on which bales T of tobacco to be sampled are conveyed.

The sample-taking apparatus 100 includes a rectangular support member 110 mounted on shaft 104 for swinging pivotable movement between a position over the bale T (FIG. 2) to a position over the sample transfer apparatus 10 (FIG. 3). At the front or outermost end of the support member 110 a double-acting, fluid-operated cylinder, such as a pneumatic cylinder 112, is rigidly mounted. A sample coring tube 114 is operatively connected to the actuating rod or piston rod (not shown) of the cylinder 112. Core tube 114 is vertically reciprocable from its retracted position to a position shown in phantom in FIG. 2 in which the coring tube is driven into the bale T to take a cored sample from the bale. An extension 116 mounted to the bottom of support member 110 supports a guide plate 118 through which core tube 114 passes. Guide plate 118 insures that the core tube 114 moves along the vertical coring axis and thereby avoids bending or other damage to the tube 114 or the other components of the sample-taking apparatus.

After a sample has been cored from bale T, the core tube 114 is retracted to its uppermost position shown in FIG. 2. The support member 110 is then pivoted by means, such as a fluid-operated cylinder (not shown), connected between cross member 103 and the support member 110, to the position shown in FIG. 3 over the sample transfer apparatus 10. In that position, the core tube 114 is vertically aligned with the inlet funnel 22 of the hammermill 16. The sample of tobacco in the tube 114 is then driven out of the core tube 114 by a plunger mechanism (not shown) and into the hammermill 16 via inlet funnel 22. After delaminating, the sample is deposited by gravity in a sample canister C in a manner to be described.

Referring now to FIG. 4, that portion of the transfer apparatus located at the remote stem content analyzer S is designated generally by reference numeral 120. The stem content analyzer S is shown and described in detail in the aforesaid U.S. application Ser. No. 324,887, the disclosure of which is incorporated herein by reference. The apparatus 120 is similar in construction and operation to the transfer apparatus 10 shown in FIG. 1. The pneumatic transfer tube 28 terminates at the stem content analyzer in a downwardly open end fitting 122 which is substantially identical to the open end fitting 30 of the transfer apparatus 10. The open end fitting 122 is closable by an end fitting 123 which is substantially identical to end fitting 40 shown in FIG. 1.

The tube 28 is provided with one or more pressure relief valves 124 which control the venting of air pressure that builds up in the tube 28 as the sample transfer canister 200 (acting as a floating piston) is pneumatically driven from the sample transfer apparatus 10 to the remote stem content analyzer, or vice versa. Relief valve 124 also controls the venting of the pneumatic tube 28 so that when a canister 200 arrives at the vertical portion of the tube 28 at a relatively high velocity, it is rapidly slowed to substantially zero or near zero velocity by an air cushion or air brake formed by the build-up of pressure in front of the canister. Otherwise, the canister 200 would strike the end fitting 123 with a force sufficient to damage it. Leakage of air past the canister allows it to descend gradually into the closed end fitting 123. As will be appreciated by those skilled in the art, a relief valve similar to valve 124 is also utilized in the vertical portion of the tube 28 at the transfer apparatus 10 and at appropriate locations in other portions of the pneumatic transfer tube 28 depending on, among other things, the transfer distance.

Means 126 comprising a rodless cylinder 125 with a slide 129 and a pneumatic cylinder 127 are provided for vertically moving end fitting 123 up and down to appropriate positions in the operational sequence. An air blower 128 of the same type as blower 32 is mounted on the base 133 of the stem content analyzer and is connected via a flexible conduit 130 to end fitting 123. Blower 128 is used after the tobacco sample has been discharged to the stem content analyzer to pneumatically return the empty canister to the transfer apparatus 10 via tube 28.

A canister discharge means 132 is supported on the frame 131 of the stem content analyzer and comprises a rodless cylinder 134 pivotally mounted on a pivot shaft 136 between a pair of arms 138 (only one shown). Arms 138 are mounted for limited pivotal movement about a pivot axis 140 by means of two pair of double-acting fluid cylinders 142a and 142b (only one pair shown) situated in end-to-end relation. The slide 135 of rodless cylinder 134 supports a pair of vertically aligned suction cups 144 which are connected to a vacuum source (not shown). A crank arm 146 is connected to the rodless cylinder 134 and is used for pivoting the rodless cylinder 134 about pivot axis 136. The actuating rod 148 of a double-acting fluid-operated cylinder, such as a pneumatic cylinder 150, is connected to crank arm 146 by means of pivotable link 151.

Means 152 for removing and replacing the end closure of a sample canister comprises a suction cup 154 supported on frame 131 and connected to a vacuum source 156. Operation of means 152 is identical to the operation of means 81 of the sample transfer apparatus of FIG. 1. The step-by-step operation of the apparatus 120 of FIG. 4A will be described hereinafter in connection with the description of a complete cycle of the transfer of a sample canister.

Turning now to FIGS. 5–9, the sample transfer canister of the invention is designated generally by reference numeral 200 and comprises a tubular body 202 made of lightweight metal tubing, such as aluminum, or a suitable plastic tubing. In the embodiment shown, the body 202 is made of a 4 1/2" diameter aluminum tube with a wall thickness of about 1/16". A pair of identical end collars 204, 206 are secured to each end of the tubular body 202, for example, by cementing, welding or other suitable means.

The end collars each include stepped annular members 207, 209 to which are secured annular slide rings 208, 210 respectively, made of a material having a low coefficient of friction, such as an acetal polymer or copolymer (Delrin ® or Celcon ®). Rings 208, 210 bear on the inside surface of the pneumatic tube 28 and reduce the sliding friction as the canister 200 is pneumatically transported through the tube. A thin annular gasket 212, 214, preferably formed of a flexible elastomeric material, is secured at the outermost end of each annular ring 208, 210 by an annular holddown ring 216, 218 and fasteners 220 (FIG. 7). Gaskets 212, 214 provide a sufficient air seal between the canister 200 and the pneumatic tube 28 to facilitate pneumatically pushing the canister through the tube.

Figure 9:
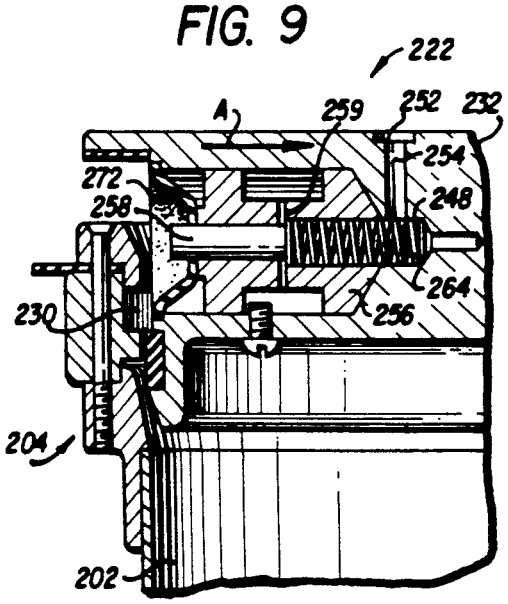
FIG. 9 is an enlarged detail of the end closure in cross-section illustrating how the closure is released from the canister by vacuum.

Each end collar 204, 206 is provided with an identical end closure 222, 224, the construction of which is shown in detail in FIGS. 8 and 9. Referring first to the cross-sectional view shown in FIG. 8, the tubular body 202 of the canister is bonded to the inside circumferential wall 211 of the stepped annular member 207 to which the annular slide ring 208, gasket 212 and ring 216 are secured by fasteners 220, such as screws. The rings 208 and 216 are provided with confronting annular shoulders 224, 226 which, together with an inside circumferential surface 228 of the ring 208, form an internal annular groove 230 on the end collar 204 for a purpose to be described.

End closure 222 comprises a cast or machined, generally cylindrical body 232 having a depending annular skirt 234 on the outer surface of which is formed an annular groove 236. An annular sealing band 238 is disposed in the groove 236 for sealing against a tapered inner surface 240 of stepped annular member 207. Closure body 232 is constructed with three radial bores 242, only one of which is shown in FIG. 8 and described herein. Bores 242 are arranged in equi-angular spaced relation 120° apart. Between each pair of radial bores 242 a cavity or cutout 244 is formed in the body 232.

Radial bores 242 are cylindrically shaped and terminate at the innermost ends thereof in a conical surface 246 with a small stepped cylindrical bore 248. The top surface 250 of the body 232 is provided with an annular recess 252 (FIG. 6) and holes 254 connect the annular recess 252 with each of the small bores 248.

A cylindrical spool member 256, preferably made of a plastic material, is slidably received in each radial bore 242. A plunger 258 is inserted in a central stepped bore 260 in the spool 256 so as to project from the radially outermost end of the spool. A stop pin 259 is inserted transversely across bore 260 to retain plunger 258 in position. The radially innermost end of the spool 256 is formed with a conical surface 261 complimentary to the conical surface 246 and is spaced therefrom to form a cavity 262. Bores 248 and 260 are coaxially aligned for receiving a helical spring 264 which is biased in a direction to urge the spool radially outwardly.

A stop screw 266 is threaded into the radial bore 242 from the bottom surface 268 of the closure body 232 and extends into an annular groove 270 formed on the exterior surface of the spool 256. Stop screw 266 permits the spool 256 to be forced radially inwardly until the mating conical surfaces 261, 246 of the spool and bore contact one another, but prevents the spring 264 from forcing the spool radially out of the bore.

Preferably, a flexible diaphragm 272 is bonded or otherwise secured over the open end of radial bore 242 and forms a seal around the opening of the bore as well as around the plunger 258. Diaphragm 272 forms a substantially airtight flexible closure at the radially outermost end of the bore 242. Closure body 232 has an annular flange 274 at its uppermost end which compresses an annular gasket 276 against annular holddown ring 216 to form a further seal between the end closure 222 and the end collar 204. Flange 274 may comprise a separate plate mechanically fastened to body 232.

In the position shown in FIG. 8 the plungers 258 of each of the three spools 256 are extended outwardly under the force of the springs 264 and engage in the internal annular groove 230 formed in the end collar 204. That engagement retains the end closure 222 on the end collar 204 in the normal condition of the components when the canister is being transported in the pneumatic tube 28. It is apparent that during pneumatic transfer of the canister the positive pressures (i.e., above atmospheric) on both ends of the canister communicate via the holes 254 and bores 248 with the cavity 262 and augment the radially outward bias of the spring 264 on the spool and plunger.

FIG. 9 illustrates the manner in which the end closure is removed from the canister. When a vacuum source is applied to the top of the end closure 222 over the annular recess 252 and the three holes 254, the air in the holes 254, bores 264 and the cavity 262 radially inwardly of the spool 256 is evacuated. The ambient air in the space radially outwardly of the diaphragm 272 thus expands radially inwardly and forces the spool 256, plunger 258 and pin 259 to compress spring 264 and to move in the direction shown by the arrow A in FIG. 9. That movement retracts the plungers 258 from the groove 230 thereby releasing the end closure 222 from locking engagement with the end collar 204, permitting withdrawal of the end closure and opening of one end of the canister. The construction and operation of the other end closure 224 is identical to that described in connection with end closure 222.

Referring now to FIGS. 10–16 the automatic insertion and removal of the sample canister 200 from the pneumatic transfer tube 28 and the loading of the tobacco sample into the canister will be described. FIG. 10 illustrates the position of the canister 200 when it is returned empty from a receiving station, such as the stem content analyzer of FIG. 4A or the receiving station of FIG. 17, for receipt of a tobacco sample from another bale of tobacco. In this position the mating surfaces 31, 41 of the end fittings 30, 40 are in sealing engagement and the canister 200 is supported on the end fitting 40. The slide 45 of rodless cylinder 44, to which end fitting 40 is secured, is in its uppermost vertical position and the pneumatic cylinder 48 is in its retracted position thus locating the end fitting 40 in its uppermost vertical position.

FIG. 11 illustrates the next step in the transfer sequence. The rodless cylinder slide 45 is moved downwardly to its lowermost vertical position with the pneumatic cylinder 48 still in its retracted position. The end fitting 40 with the canister 200 supported thereon is lowered to a position where the upper end of the canister is still disposed in the open end fitting 30 of the pneumatic tube.

Referring now to FIG. 12, after the end fitting 40 is lowered, the carriage 66 which supports rodless cylinder 60 is extended to its far left position on guide rods 68 by pneumatic cylinders 72, 74 (FIG. 1). The slide 62 of rodless cylinder 60 was previously raised to its uppermost vertical position so that the suction cups 64 engage the body of canister 200 at two locations substantially equidistant from the midpoint of the length of the canister. The suction cups 64 are applied with the canister body in the position shown in FIGS. 11 and 12, i.e., with the top and bottom of the canister still retained in end fittings 30, 40 to prevent the canister from being toppled over when the suction cups 64 first come into contact with the canister body. Vacuum is thereafter applied to the suction cups 64 which causes the suction cups to grip the canister body with sufficient suction force to support the entire weight of the canister.

Figure 14:
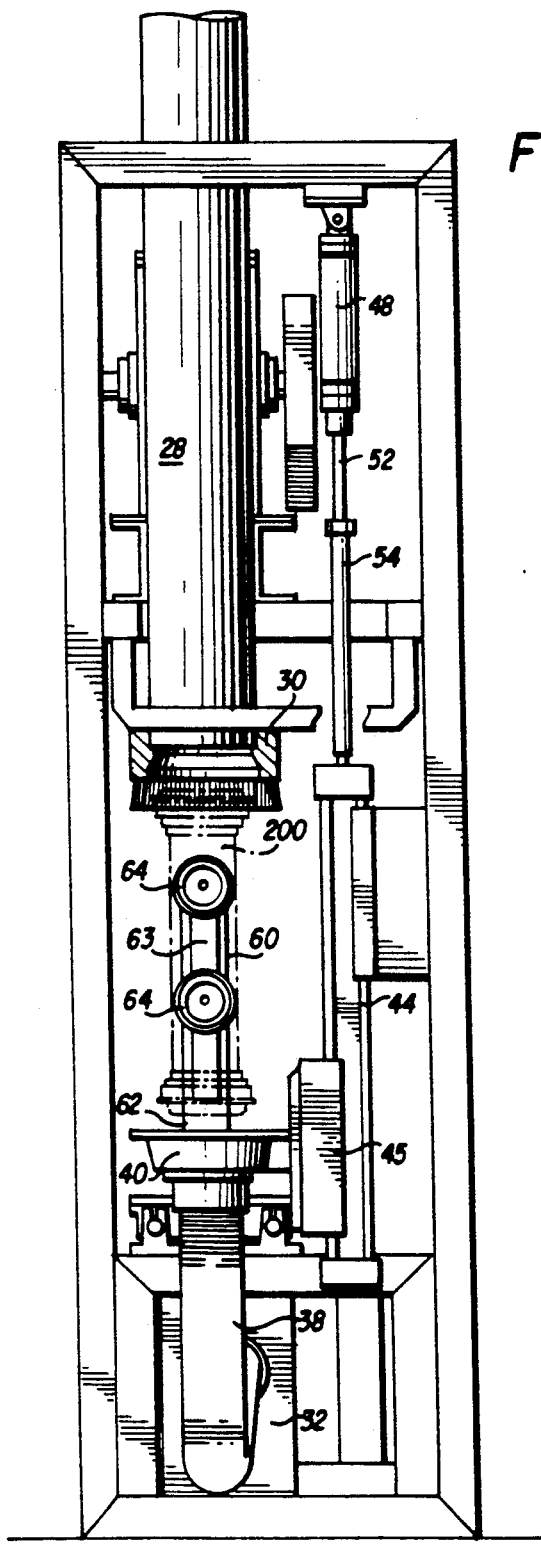
FIG. 14 is an end elevation view of the transfer apparatus of FIG. 1 illustrating the sample canister in position for transfer to the sample loading position.
Figure 13:
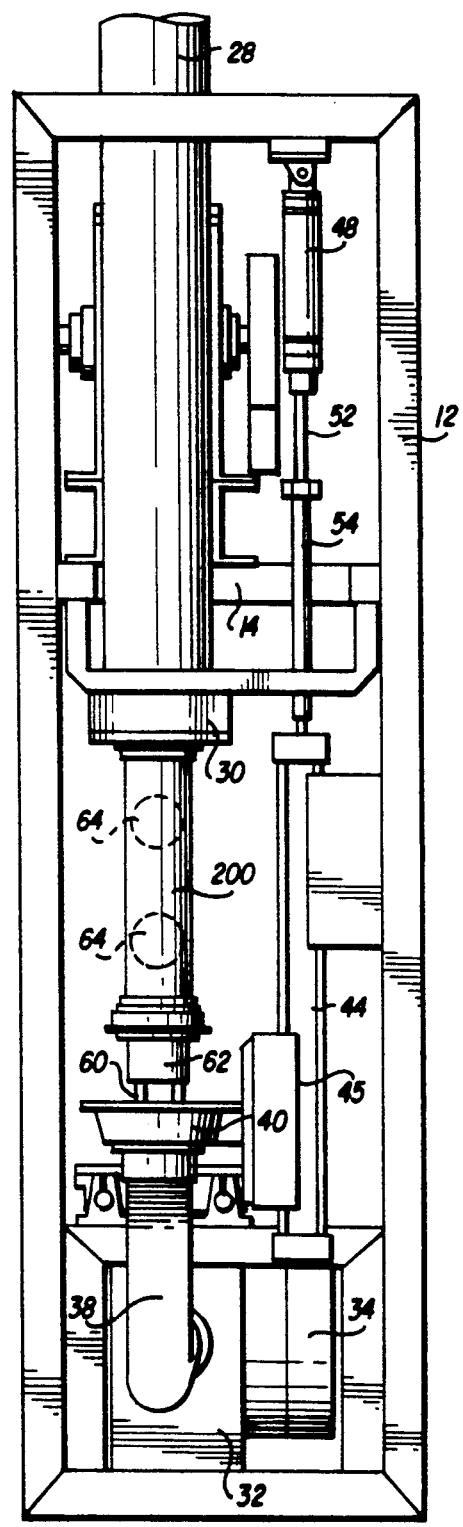
FIG. 13 is an end elevation view of the transfer apparatus of FIG. 1 illustrating further positions of the transfer mechanisms during the transfer sequence.

With the vacuum maintained on the suction cups 64, the pneumatic cylinder 48 is extended as shown in FIG. 13 to lower the rodless cylinder 44 and its slide 45 thereby disengaging the end fitting 40 from the bottom end of the canister and positioning end fitting 40 in its lowermost vertical position. FIG. 14 illustrates the next step in the transfer sequence and shows the canister 200 in phantom lines. In this position, the slide 62 of rodless cylinder 60 has been moved to its lowermost vertical position, thereby withdrawing the canister 200 completely from within open end fitting 30 and clearing the canister for horizontal movement away from the axis of the pneumatic tube 28.

Figure 15:
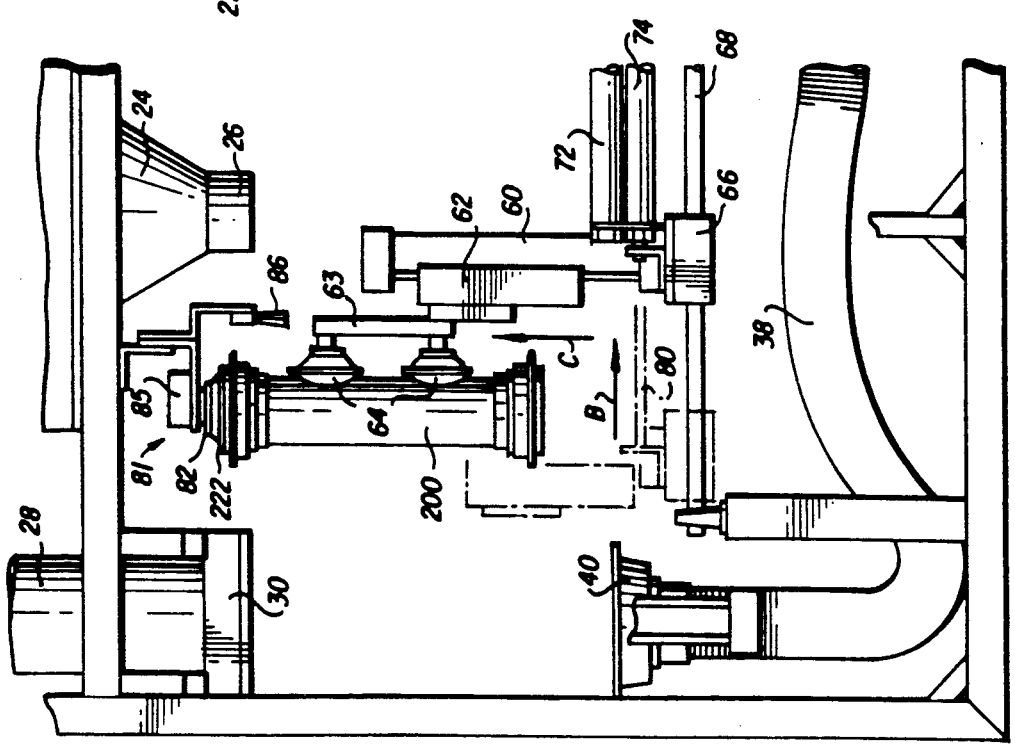

The next steps in the sequence are illustrated in FIG. 15 wherein the positions of the rodless cylinder 60, slide 62 and carriage 66 are partially shown in phantom lines in the positions they occupy in FIG. 14 after the slide 62 has been moved to its lowermost position. Cylinder 74 is actuated to retract rod 80 which moves the carriage 66 and all the components supported thereon, including the canister, in the direction shown by the arrow B to a position directly beneath the closure removing and replacing means 81. Slide 62 of the rodless cylinder 60 is moved in the direction of the arrow C to its uppermost vertical position shown in solid lines in FIG. 15. In that position, the upper end closure 222 engages suction cup 82 to which a vacuum is applied. The vacuum releases the end closure 222 from the canister in the manner described above in connection with FIGS. 5–9. The slide 62 is then moved downwardly leaving the end closure 222 retained on the suction cup 82 and the upper end of the canister open.

Figure 16:
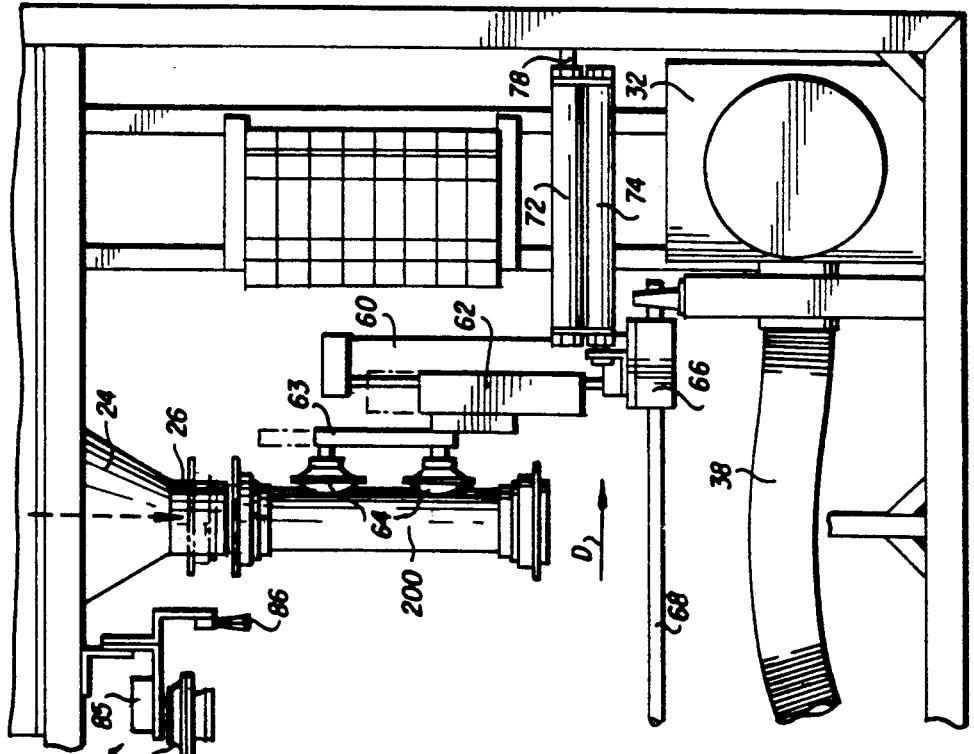
FIGS. 15 and 16 are side elevation views of the transfer apparatus of FIG. 1 illustrating the steps of translating the sample canister to the positions for removing the end closure, depositing the sample in the canister, replacing the end closure and positioning the canister for pneumatic transfer to the stem content analyzer.

With the slide 62 still in its lowered position, cylinder 72 is actuated to retract rod 78 and move the carriage 66 along guide rods 68 in the direction shown by the arrow D to position the canister directly beneath the outlet tube 26 (FIG. 16). Thereafter, the slide 62 with the canister 200 is moved to its uppermost position shown partially in phantom lines so that the sample outlet tube 26 projects into the open upper end of the canister. In this position, a cored tobacco sample is inserted into the hammermill 16 via inlet funnel 22 (FIG. 1), the sample is delaminated as described above and discharged via funnel 24 and outlet tube 26 into the canister 200. After the tobacco sample has been deposited in the canister 200 the sequence of operation of the transfer apparatus is simply reversed to return the now-filled sample canister to the pneumatic tube 28 for transport to the stem content analyzer.

Briefly described, that sequence is as follows: The filled sample canister is lowered from the outlet tube 26 by slide 62. Cylinder 72 is actuated to extend rod 78 and move the carriage 66 to a position beneath the suction cup 82. As the upper end of the canister passes optional brush 86, any tobacco particles that may have been deposited on the upper end of the canister are swept off by the brush 86. Brushing of the top surface insures that no tobacco particles will interfere with the proper sealing of the end closure. The canister is then raised again at the suction cup 82 and when the slide 62 reaches its uppermost position, the vacuum on suction cup 82 is released thereby permitting the end closure 222 to lockingly engage the canister. Next, the slide 62 is lowered and the cylinder 74 is actuated to extend rod 80 and reposition the filled sample canister in line with the axis of pneumatic tube 28 (FIG. 14).

In that position, slide 62 is raised to insert the upper end of the canister into the open end fitting 30 (FIG. 13). Cylinder 48 is actuated to retract rod 52 and raise end fitting 40 (FIGS. 11 and 12). The vacuum is released from suction cups 64 which disengage from the canister body. Cylinder 72 is actuated to retract rod 80 and move the carriage 66 and the means 58, including the suction cups 64, away from the canister. Slide 45 is moved to its uppermost position to fully insert the canister into the tube 28 and seal the end fittings 30, 40 (FIG. 10). Once that seal is made, the air blower 32 is started and air pressure forces the canister upwardly through the pneumatic tube 28 toward the stem content analyzer.

Figure 4A:
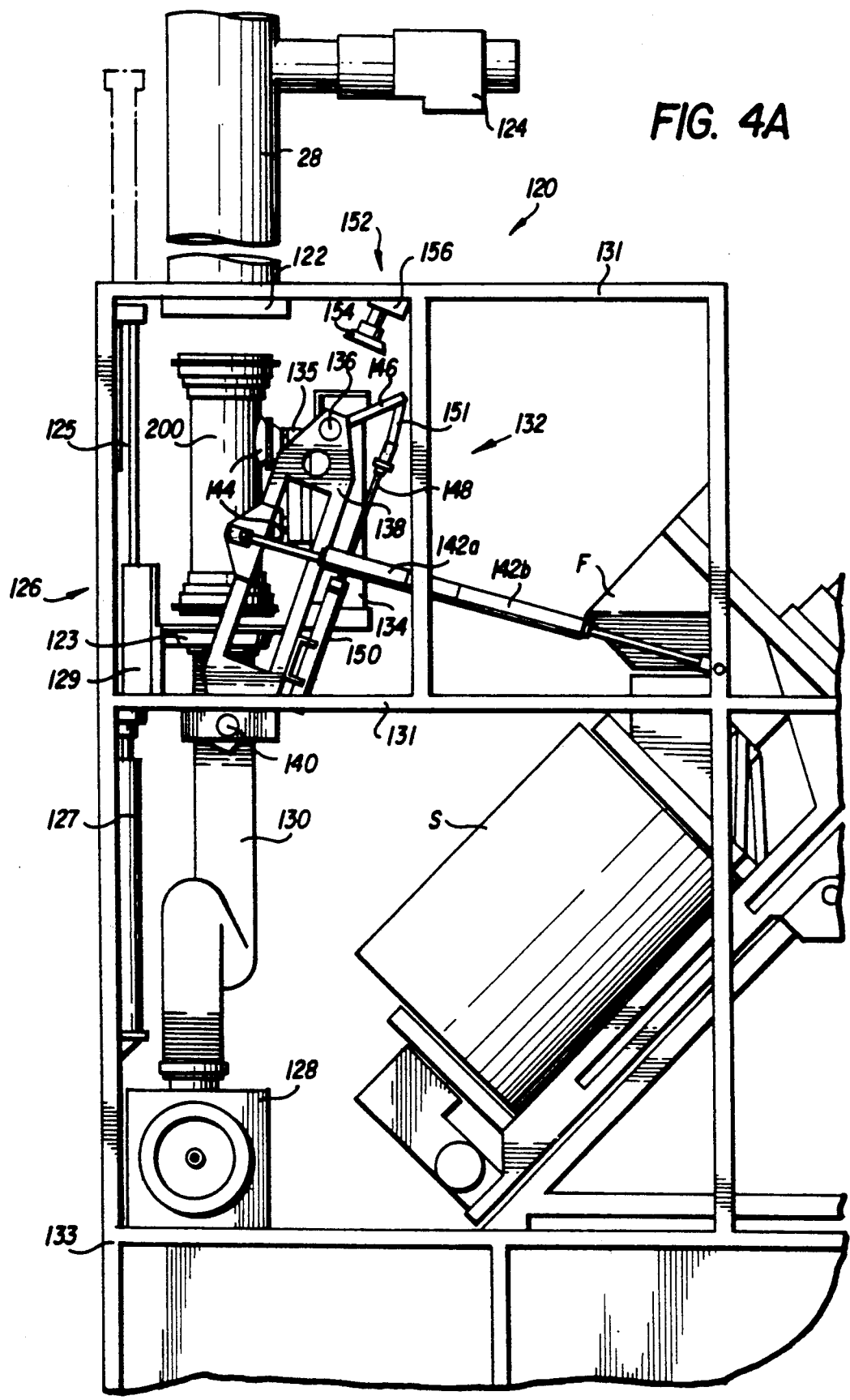
FIG. 4A is a side elevation view showing the inlet part of a stem content analyzer and that portion of the transfer apparatus of the present invention associated with inputting a tobacco sample to the analyzer.
Figure 4B:
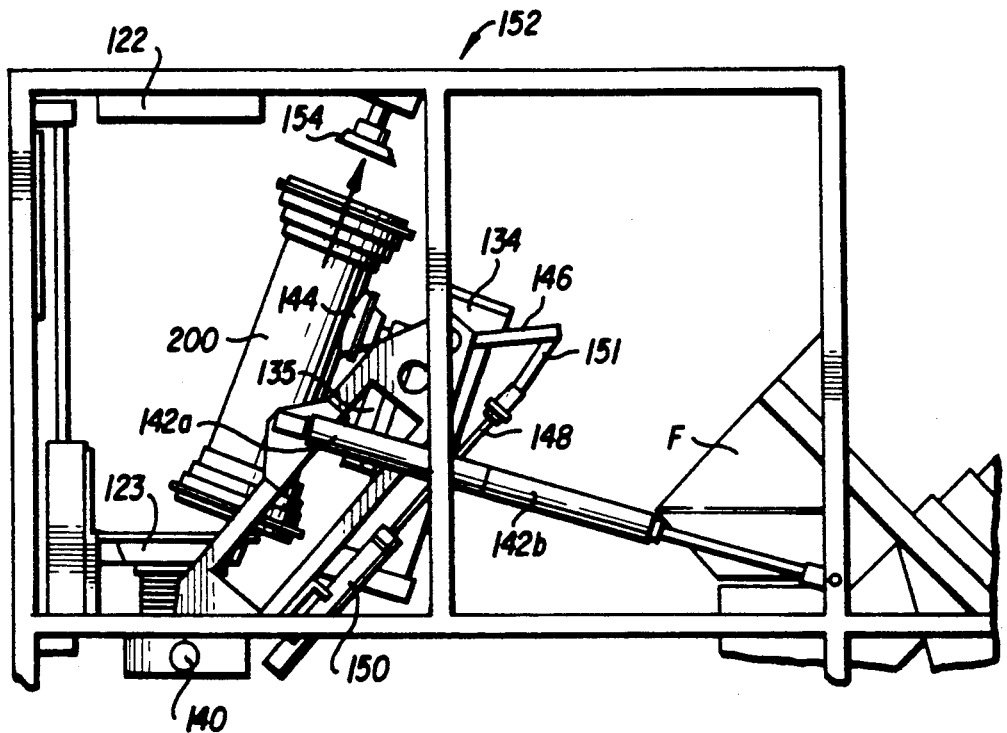
FIG. 4B is a side elevation view of the inlet part of a stem content analyzer and the associated portion of the transfer apparatus showing the canister in position for removal and replacement of the canister closure.

Referring now to FIGS. 4A-4B, when the canister 200 with the tobacco sample arrives at the stem content analyzer on an air cushion in the tube 28 as above described, it is gradually lowered onto the end fitting 123 by air leakage past the canister. Means 126, including rodless cylinder 125 and air cylinder 127, for vertically moving the end fitting 123 are similar in design to the means 43 for vertically moving the end fitting 40 in the transfer apparatus 10. Since the end fitting 123 is located near the upper portion of the stem content analyzer frame 131, it is preferable that the positions of the rodless cylinder 125 and cylinder 127 be reversed from their respective positions in the means 43 of transfer apparatus 10.

The operational sequence for removing the canister from the tube 28 is also similar to the sequence of operation described above in connection with FIGS. 10-14. Initially, rodless cylinder 134 is operated to move the slide 135 and suction cups to the uppermost position. The slide 129 of rodless cylinder 125 (shown in its uppermost position in phantom in FIG. 4A) would be in its uppermost position and the pneumatic cylinder 127 would be fully extended so that the end fitting 123 is sealingly engaged with open end fitting 122. Pneumatic cylinders 142a are retracted and cylinders 142b are extended to the position shown in FIG. 4B so as to clear the area beneath the open end fitting 122 of pneumatic tube 28.

With the canister resting on end fitting 123, rodless cylinder 125 is operated to move the end fitting 123 downwardly to lower the canister to a position relative to the pneumatic tube 2 corresponding to that shown in FIG. 11. Pneumatic cylinder 142a is then extended to pivot arms 138 and rodless cylinder 134 counterclockwise so that the suction cups 144 engage the wall of canister 200 and vacuum is applied to cause the suction cups to grip the canister. This point in the operational sequence corresponds to that shown in FIG. 12. Thereafter, the cylinder 127 is retracted to lower rodless cylinder 125 together with end fitting 123 away from the lower end of the canister in a manner similar to that illustrated in FIG. 13. The slide 135 of rodless cylinder 134 is moved downwardly to disengage the upper end of the canister 200 from the open end fitting 122. That sequential position is shown in FIG. 4A and corresponds to the position illustrated in FIG. 14.

Referring now to FIG. 4B, pneumatic cylinders 142a are retracted to pivot the arms 138 clockwise to a position where the axis of the canister is substantially aligned with the end closure removal means 152. In the position shown in FIG. 4B, the rodless cylinder 134 is actuated to raise slide 135 and cause the upper end closure of canister 200 to engage the suction cup 154. Vacuum is applied to the suction cup 154 by vacuum means 152 to release the end closure as described above in connection with FIGS. 5-9 and slide 135 is lowered to remove the upper end closure from the canister leaving the opened canister supported on the slide 135 by the suction cups 144.

Figure 4C:
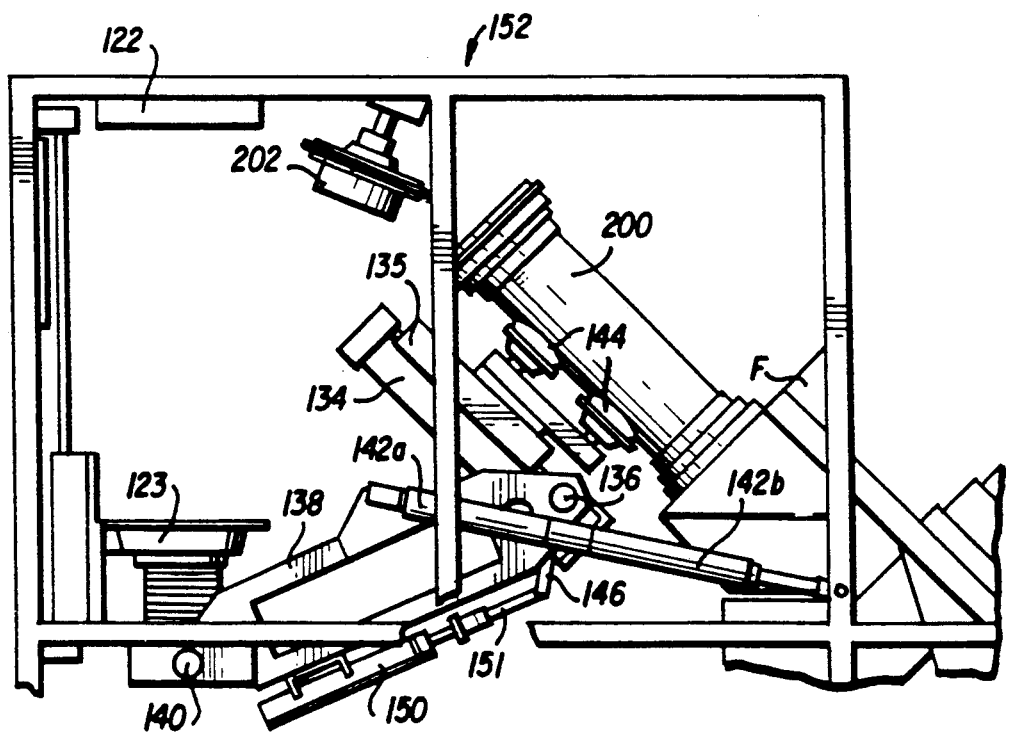
FIG. 4C is a side elevation view of the inlet portion of a stem content analyzer and the associated portion of the transfer apparatus showing the canister in its up-ended position for depositing the tobacco sample into the inlet funnel of the stem content analyzer.

The next step in the operational sequence is shown in FIG. 4C in which pneumatic cylinders 142b are retracted to rotate the arms 138 further clockwise to clear the end closure 202 and the closure removal means 152. Pneumatic cylinder 150 is then retracted to operate crank 146 through link 151 and rotate the rodless cylinder 134 and canister 200 about pivot 136 to the position shown in FIG. 4C. In this position, the tobacco sample in the canister 200 is emptied from the canister and deposited in a funnel F which is the input for the stem content analyzer apparatus S.

After the canister is emptied, the operational sequence is reversed to reposition the canister as shown in FIG. 4B for replacement of the end closure and then to position the canister as shown in FIG. 4A for reinsertion of the canister into the pneumatic tube 28 for return to the transfer apparatus 10.

A microprocessor or an analog control system may be used to control the sequential operation of all the components of the tobacco sample transfer apparatus of the present invention. Such a control system is well known to those skilled in the art and is therefore not further described herein.

FIG. 17 illustrates an alternative type of receiving station designated generally with reference numeral 300. Receiving station 300 may be located, for example, in a laboratory where chemical analyses are performed on tobacco being processed and it is desired to automatically deliver a tobacco sample to the laboratory from the processing line from time to time. In this embodiment of the invention, it is contemplated that the pneumatic tube 28 would terminate in the laboratory instead of at the stem content analyzer S shown in FIGS. 4A-4C.

Receiving station 300 comprises a cabinet 302 at the base 304 of which a blower 306 (similar to blowers 32 and 128) is mounted. Pneumatic tube 28 enters the upper end 308 of the cabinet and terminates at open end fitting 310. End fitting 312 (shown in its lowermost position in FIG. 17) is raised to close open end fitting 310 when a sample canister is to be delivered to the receiving station.

End fitting 312 is connected to the slide 314 of a rodless cylinder 316, similar to rodless cylinders 44 and 125 described above, so as to be vertically movable from a position in which the fitting 312 sealingly engages open end fitting 310 to its lowermost position shown in FIG. 17. Flexible conduit 318 is connected between the outlet pipe 320 of blower 306 and the end fitting 312.

Referring now to FIG. 18, a suction cup 322 is mounted to the upper end 308 of the cabinet 302 in a position in front of open end fitting 310 as viewed when facing the receiving station 300 in FIG. 17. Vacuum pump 324 is connected to suction cup 322 by tubing 326. A control panel 328 is located on a work table 330 mounted to the cabinet and includes manual switches (not shown) for operating the blower 306, the rodless cylinder 316 and the vacuum pump 324.

Operation of the receiving station 300 proceeds after a sample canister arrives in the pneumatic tube 28 from transfer apparatus 10. The canister rests upon the end fitting 312 in it uppermost position sealed against the open end fitting 310. An operator actuates the switches on control panel 328 to operate vacuum pump 324 and rodless cylinder 316. The slide 314 of rodless cylinder 316 moves to the lowermost position shown in FIG. 17 with the sample canister (shown in phantom lines) resting upon it. The operator then manually removes the canister from end fitting 312 and raises the canister to engage the top end closure with the suction cup 322 which operates the end closure as described above in connection with FIGS. 5-9 and releases it from the canister. The tobacco sample may then be emptied from the canister for testing/analysis purposes.

To return the empty canister to the transfer apparatus 10, the operator takes the canister and raises it to insert the end closure still supported on the suction cup 322 into the open end of the canister and turns off the vacuum pump 324 to release the end closure. The canister is then placed in the end fitting 312 and rodless cylinder 316 is operated to raise slide 314 and end fitting 312 into sealing engagement with end fitting 310. The operator then actuates the switch for the blower 306 which pneumatically drives the canister back to the transfer apparatus 10.

Although certain presently preferred embodiments of the invention have been described herein, it will be apparent to those skilled in the art to which the invention pertains that variations and modifications of the described embodiment may be made without departing from the true spirit and scope of the invention. Accordingly, it is intended that the invention be limited only to the extent required by the appended claims and the applicable rules of law.

What is claimed is:

1. Apparatus for automatically transferring a canister containing a sample of a material from a first location to a second location comprising:
   tube means extending from said first location to said second location;
   means at said first location for collecting a sample of material;
   means at said first location for automatically depositing the collected sample into the canister;
   means for automatically inserting the canister into the tube means at said first location; and
   means generating a force for driving the canister through said tube means from said first location to said second location.

2. Apparatus according to claim 1, wherein the canister has at least one removable closure, and including means disposed between said depositing means and said inserting means for automatically removing and replacing the removable end closure of the canister.

3. Apparatus according to claim 2, wherein said end closure removing and replacing means comprises suction means for gripping the canister end closure and fluid-actuated means for relatively moving the canister and suction means toward and away from one another.

4. Apparatus according to claim 3, wherein said fluid-actuated means comprises a rodless cylinder having a slide member, and means mounted on the slide member for gripping and supporting the canister.

5. Apparatus according to claim 4, wherein said gripping and supporting means comprises suction cups.

6. Apparatus according to claim 2, including means for automatically shifting the canister between said sample depositing means and said end closure removing and replacing means and between said end closure removing and replacing means and said inserting means.

7. Apparatus according to claim 6, wherein said shifting means comprises a carriage, means for supporting the canister on the carriage, means slidably supporting the carriage for horizontal sliding movement therealong and fluid-actuated means connected to the carriage for positioning the carriage at one of three discrete locations adjacent a respective one of said depositing means, said end closure removing and replacing means and said inserting means.

8. Apparatus according to claim 7, wherein said means for supporting the canister on said carriage comprises a rodless cylinder having a slide member and suction means on said slide member for gripping the canister.

9. Apparatus according to claim 1, wherein said tube means has an axis, said inserting means comprising means cooperating with the tube means at said first location for moving said canister into said tube means along the axis of the tube means.

10. Apparatus according to claim 9, wherein said tube means has an open end at said first location, said moving means comprising an end fitting for engaging the canister and fluid-operated means for driving the end fitting into engagement with the open end of the tube means such that the canister is inserted into the tube means and the end fitting closes the open end of the tube means.

11. Apparatus according to claim 10, wherein said fluid-operated means includes at least one rodless cylinder.

12. Apparatus according to claim 10, wherein said canister driving means is a blower and a conduit connecting said blower to said end fitting.

13. Apparatus according to claim 1, including means at said second location for receiving the canister and for discharging the sample of material from the canister.

14. Apparatus according to claim 13, wherein the canister has at least one removable closure, said canister receiving and sample discharging means comprising means for automatically removing the canister from the tube means, means for automatically removing the closure from the canister and means for pivoting the canister to a position for emptying the sample of material from the canister.

15. Apparatus according to claim 13, including means at said second location generating a force for driving the canister through said tube means from said second location to said first location.

16. Apparatus according to claim 15, wherein said means for driving the canister from the first location to the second location is a first blower and said means for driving the canister from the second location to the first location is a second blower and including first conduit means adapted to be connected between said first blower and said tube means at the first location and second conduit means adapted to be connected between said second blower and the tube means at the second location.

17. Apparatus according to claim 1, wherein said sample material is tobacco and including analyzer means at said second location for analyzing the sample of tobacco received at the second location.

18. Apparatus for automatically transferring a canister from a first location to a second location, said canister having at least one removable closure and being adapted to contain a sample of tobacco, comprising:
   tube means extending from said first location to said second location;
   means at said first location for automatically removing the closure from the canister;
   means at said first location for automatically taking a sample of tobacco from a source of tobacco and for depositing said sample in the canister when the closure is removed therefrom;
   means at said first location for automatically replacing the closure on the canister after the tobacco sample has been deposited therein;
   means at said first location for automatically inserting the canister containing the sample into said tube means;
   means for pneumatically driving the canister from said first location to said second location; and
   means at said second location for automatically removing the canister from the tube means, removing the closure from the canister and discharging the tobacco sample from the canister.

19. Apparatus according to claim 18, wherein the source of tobacco is a bale of tobacco, said sample taking means comprising a coring tube means for taking a cored sample from the bale of tobacco, said depositing means including milling means for delaminating the cored sample of tobacco, said milling means having an outlet for depositing the sample in the canister.

20. Apparatus according to claim 18, including means for automatically moving the canister between the sample depositing means and the canister inserting means, said moving means comprising a carriage means for supporting the canister, means for shifting the carriage means from the canister inserting means to the closure removing means, then to the sample depositing means, then to the closure replacing means and then to the canister inserting means.

21. Apparatus according to claim 20, wherein said carriage means includes a carriage slidable along rod means supporting said carriage, a rodless cylinder having a slide and being mounted on the carriage, suction means on the slide for gripping and supporting the canister.

22. Apparatus according to claim 18, wherein said pneumatic driving means comprises a blower connectable to said tube means at said first location.

23. Apparatus according to claim 22, including a blower means connectable to said tube means at said second location for driving the canister through said tube means from the second location to the first location.

24. Method for automatically transferring a sample of material from a first location to a second location comprising the steps of:
   providing a canister with at least one removable closure;
   automatically removing the closure from the canister;
   automatically depositing the sample of material in the canister;
   automatically replacing the closure on the canister;
   pneumatically conveying the canister from the first location to the second location;
   automatically removing the closure from the canister at the second location; and
   automatically discharging the sample from the canister at the second location.

25. The method of claim 24 including the steps of:
   automatically replacing the closure on the canister at the second location; and
   pneumatically conveying the canister from the second location to the first location.

26. The method of claim 25, including the step of providing a canister with first and second closures, and wherein the first closure is removed and replaced at the first location and the second closure is removed and replaced at the second location.

27. The method of claim 24, wherein said material is tobacco and including the steps of coring the sample from a bale of tobacco and delaminating the cored sample of tobacco.

28. The method of claim 29, including the step of automatically pivoting the canister at the second location to a fourth position for removal of the closure then to a fifth position for discharging the sample, then to the fourth position for replacement of the closure, then to a sixth position for conveying the canister to the first location.

29. The method of claim 24, including the step of automatically moving the canister to a first position at the first location for removal of the closure, then to a second position for depositing the sample in the canister, then to the first position for replacing the closure, then to a third position for conveying the canister to the second location.

30. The method of claim 24, wherein the sample is tobacco and including the step of measuring a characteristic of the tobacco sample at the second location.

31. The method of claim 30, wherein the measuring step comprises determining the stem content of the sample of tobacco.

32. The method of claim 24, wherein the sample discharging step comprises upending the canister to discharge the material from the canister by gravity.

33. A canister for use in a pneumatic transfer tube comprising:
   a tubular body having two ends, at least one of said ends being open;
   an annular slide ring disposed at each end of the tubular body, each slide ring being made of a material having a low coefficient of friction;
   a gasket means at each end of the tubular body adjacent the slide ring for sealing the canister in a transfer tube so as to permit the pneumatic transfer of the canister through the transfer tube;
   a removable end closure disposed at said open end of the tubular body; and
   means in said end closure cooperating with the tubular body for releasably securing the end closure to said open end of the tubular body, said securing means being responsive to a change in pressure for releasing the end closure from the tubular body.

34. A canister according to claim 33, wherein said tubular body has two open ends and one of said removable end closures being disposed in each open end of the tubular body.

35. A canister according to claim 33, wherein said releasable securing means comprises a plurality of movable plungers in said end closure, said tubular body having an annular groove at the open end thereof, said plungers being movable into and out of engagement with said groove.

36. A canister according to claim 35, wherein said end closure is circular, a plurality of radial bores in said end closure, a spool radially slidable in each bore, each spool supporting one of said plungers for radial movement in a respective bore, means communicating the radial bores with each other and with holes extending to an exterior surface of the end closure, whereby a suction pressure applied to the holes in said exterior surface draws the spools radially inwardly to disengage the plungers from the annular groove in the open end of the tubular body.

37. A canister according to claim 36, including spring means disposed in each of said bores for urging each spool radially outwardly such that the plungers engage the annular groove in the open end of the tubular body.

38. A canister according to claim 36, including a flexible diaphragm sealingly mounted at the outermost end of each radial bore, said plungers extending sealingly through said diaphragm.

39. A canister according to claim 33, wherein said change in pressure is a change from ambient pressure to a suction pressure.

* * * * *